US012370655B2

(12) United States Patent
Peng

(10) Patent No.: US 12,370,655 B2
(45) Date of Patent: Jul. 29, 2025

(54) HAND TOOL CAPABLE OF SWITCHING OPERATING DIRECTION

(71) Applicant: Chih-Ping Peng, Taichung (TW)

(72) Inventor: Chih-Ping Peng, Taichung (TW)

( * ) Notice: Subject to any disclaimer, the term of this patent is extended or adjusted under 35 U.S.C. 154(b) by 338 days.

(21) Appl. No.: 17/968,616

(22) Filed: Oct. 18, 2022

(65) Prior Publication Data

US 2024/0123580 A1 Apr. 18, 2024

(51) Int. Cl.
*B25B 15/04* (2006.01)
*B25B 13/46* (2006.01)
*B25B 23/00* (2006.01)

(52) U.S. Cl.
CPC ............ *B25B 15/04* (2013.01); *B25B 13/463* (2013.01); *B25B 23/0035* (2013.01)

(58) Field of Classification Search
CPC .... B25B 15/04; B25B 23/0035; B25B 13/463
USPC .......................................................... 81/63.1
See application file for complete search history.

(56) References Cited

U.S. PATENT DOCUMENTS 4,290,328 A * 9/1981 Clark ...................... B25B 15/04 81/62
5,613,585 A * 3/1997 Tiede ...................... F16D 41/16 81/62
9,162,348 B2 * 10/2015 Ho ...................... B25B 23/0042
10,525,571 B2 * 1/2020 Hu .......................... B25B 15/04
2015/0047473 A1 2/2015 Ryans

FOREIGN PATENT DOCUMENTS

TW 201249607 A 12/2012
TW M465246 U 11/2013

OTHER PUBLICATIONS

Office Action dated Jun. 27, 2023 of the corresponding Taiwan patent application No. 111136501.

* cited by examiner

*Primary Examiner* — Hadi Shakeri
(74) *Attorney, Agent, or Firm* — Chun-Ming Shih; hdls ipr services

(57) ABSTRACT

A hand tool capable of switching operating direction includes: a handgrip (10); an actuating unit (20) having an actuating seat (21) and a positioning set (25), the actuating seat (21) has an accommodating slot (221) and pivotal slots (222), the positioning set (25) has an elastic member (26) and a positioning member (27); a positioning unit (30) having latching members (31) and an elastic unit (32), the latching members (31) is pivotally connected to the pivotal slot (222) and has a latching tooth (331); a switching component (40) having a rotation disk (41) and abutting blocks (42), the rotation disk (41) has positioning slots (43) allowing the positioning member (27) to be mounted; and a rotating rod (50) having a ratchet (52); the positioning member (27) is selectively mounted in one of the positioning slots (27) when the rotation disk (41) is being rotated.

6 Claims, 6 Drawing Sheets

HAND TOOL CAPABLE OF SWITCHING OPERATING DIRECTION

BACKGROUND OF THE DISCLOSURE

Technical Field

The present disclosure relates to a hand tool, especially to a hand tool capable of switching operating direction.

Description of Related Art

A main function of a screwdriver is to rotate a screw, thus the screwdriver is a must-have hand tool in daily lives. Moreover, for increasing the operating convenience, there are a lot of ratchet screwdrivers capable of being switched to different operating directions available in the market.

In addition, the operating direction of a related-art ratchet screwdriver is limited, and an installation of a ratchet actuating unit is disposed for achieving the limitation. The ratchet actuating unit is composed of a ratchet, an elastic member, a latching block abutted by the elastic member, and a pushing member. When being operated, the pushing part is rotated to push the latching block to make the latching block be selectively latched with the ratchet, thus an objective of limiting the operating direction is achieved.

However, after the ratchet actuating unit has been used for a long time, the elastic member may elastically fatigue or the pushing part is not rotated to a positioning location, thus the latching block may not be pushed to a desired location, and the ratchet screwdriver may not be normally operated.

Accordingly, the applicant of the present disclosure has devoted himself for improving the mentioned disadvantages.

SUMMARY OF THE DISCLOSURE

The present disclosure is to provide a hand tool capable of switching operating direction, in which a latching member generates a stable deflecting rotation through the latching member being pivotally connected to an actuating seat, thus the whole internal structure may be greatly simplified.

Accordingly, the present disclosure provides a hand tool capable of switching operating direction, which includes a handgrip, an actuating unit, a positioning unit, a switching component and a rotating rod. The actuating unit is disposed in the handgrip, and includes an actuating seat and a positioning set. The actuating seat has an accommodating slot and a plurality of pivotal slots. The positioning set has an elastic member and a positioning member abutting against the elastic member. The elastic member is disposed in the accommodating slot. The positioning unit is disposed in the actuating seat. The positioning unit includes a plurality of latching members and an elastic unit. Each of the latching members is pivotally connected to each of the pivotal slots. Each of the latching members has at least one latching tooth. One end of the elastic unit is fastened with the actuating seat, and another end of the elastic unit abuts against each of the latching members. The switching component is moveably connected to the actuating seat. The switching component has a rotation disk and a plurality of abutting blocks formed on the rotation disk. The rotation disk has a plurality of positioning slots allowing the positioning member to be mounted. The rotating rod has a rod member and a ratchet disposed on the rod member. One end of the rod member sequentially passes through the rotation disk and the actuation seat, and the ratchet is arranged corresponding to each of the latching members. When the rotation disk is rotated to make the positioning member be selectively mounted in one of the positioning slots, each of the abutting blocks correspondingly abuts against each of the latching members to generate a deflecting rotation to make the latching tooth be latched with or released from the ratchet.

Advantages achieved by the present disclosure are as follows. With an arrangement of each of the latching members, the elastic unit and the actuating seat, each of the abutting sheets may stably abut against at one end of each of the latching members. With each of the pivotal slots pivotally connected to the another end of each of the latching members, each of the latching members generates the stable deflecting rotation, thus malfunctioning situations of being jammed, loosened or not being recovered due to each of the latching teeth being overly displaced are prevented.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
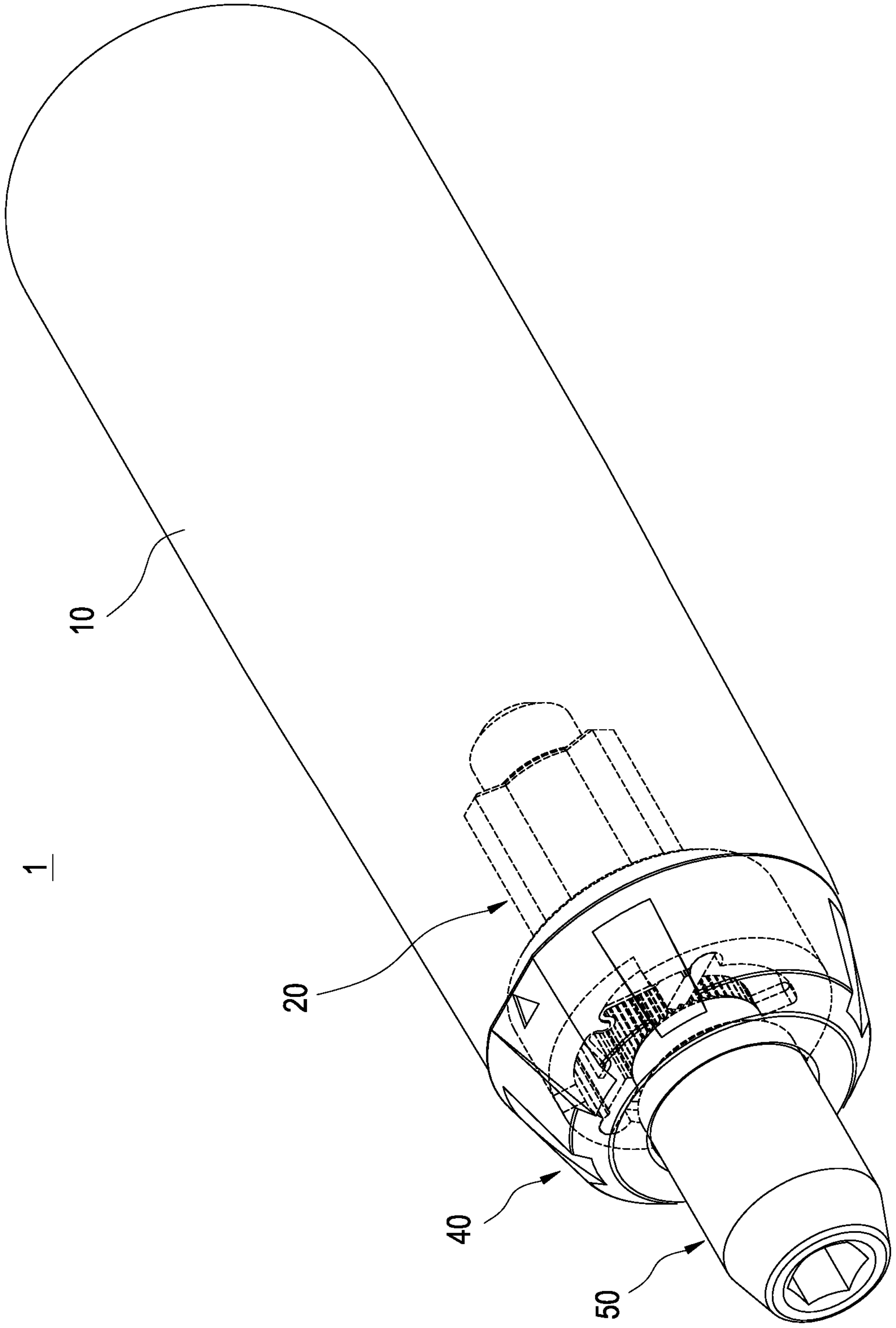
FIG. 1 is a perspective view showing the assembly of the hand tool capable of switching operating direction according to the present disclosure.
Figure 2:
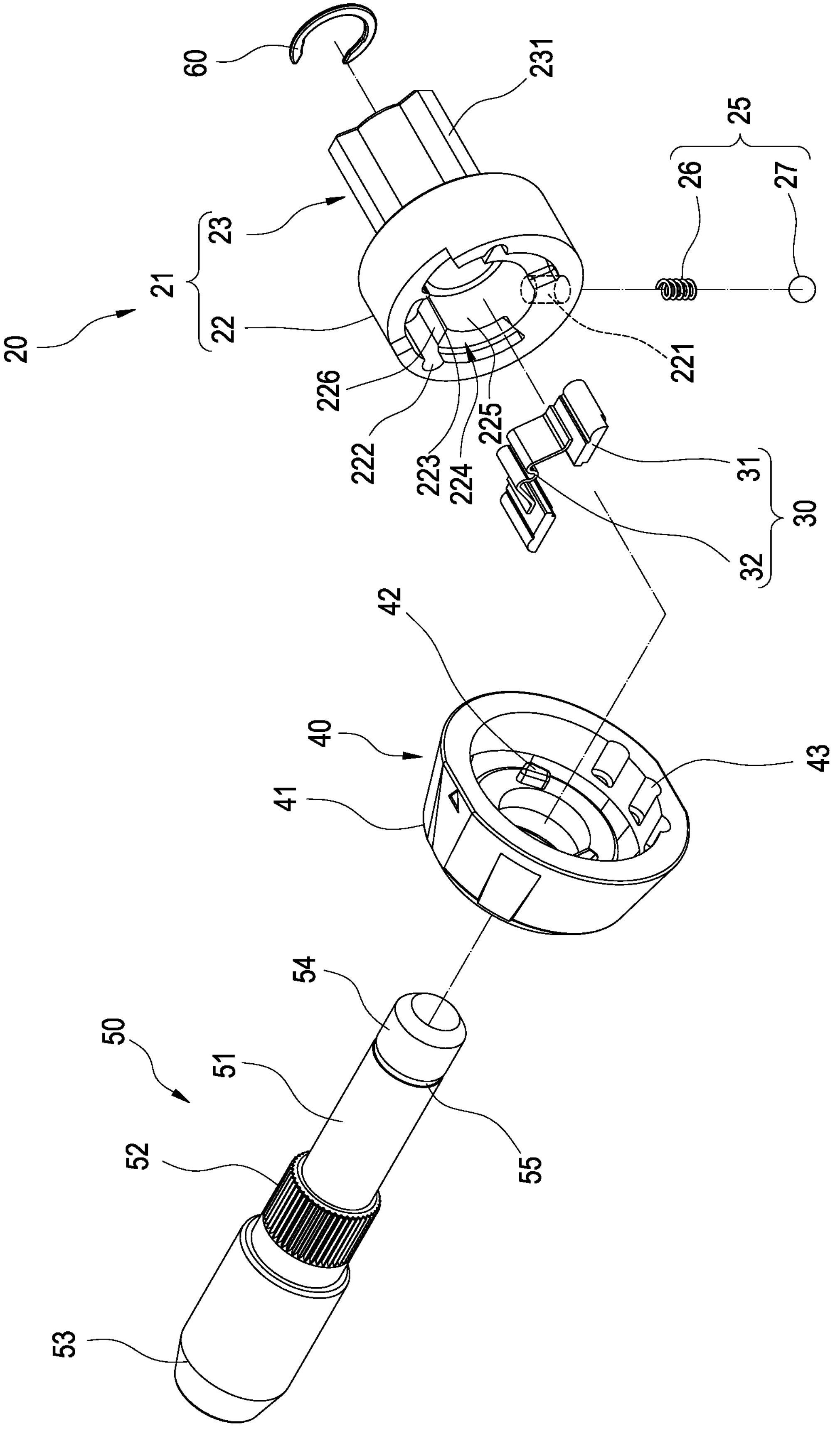
FIG. 2 is a perspective exploded view showing the actuating unit, the positioning unit, the switching component and the rotating rod according to the present disclosure.
Figure 3:
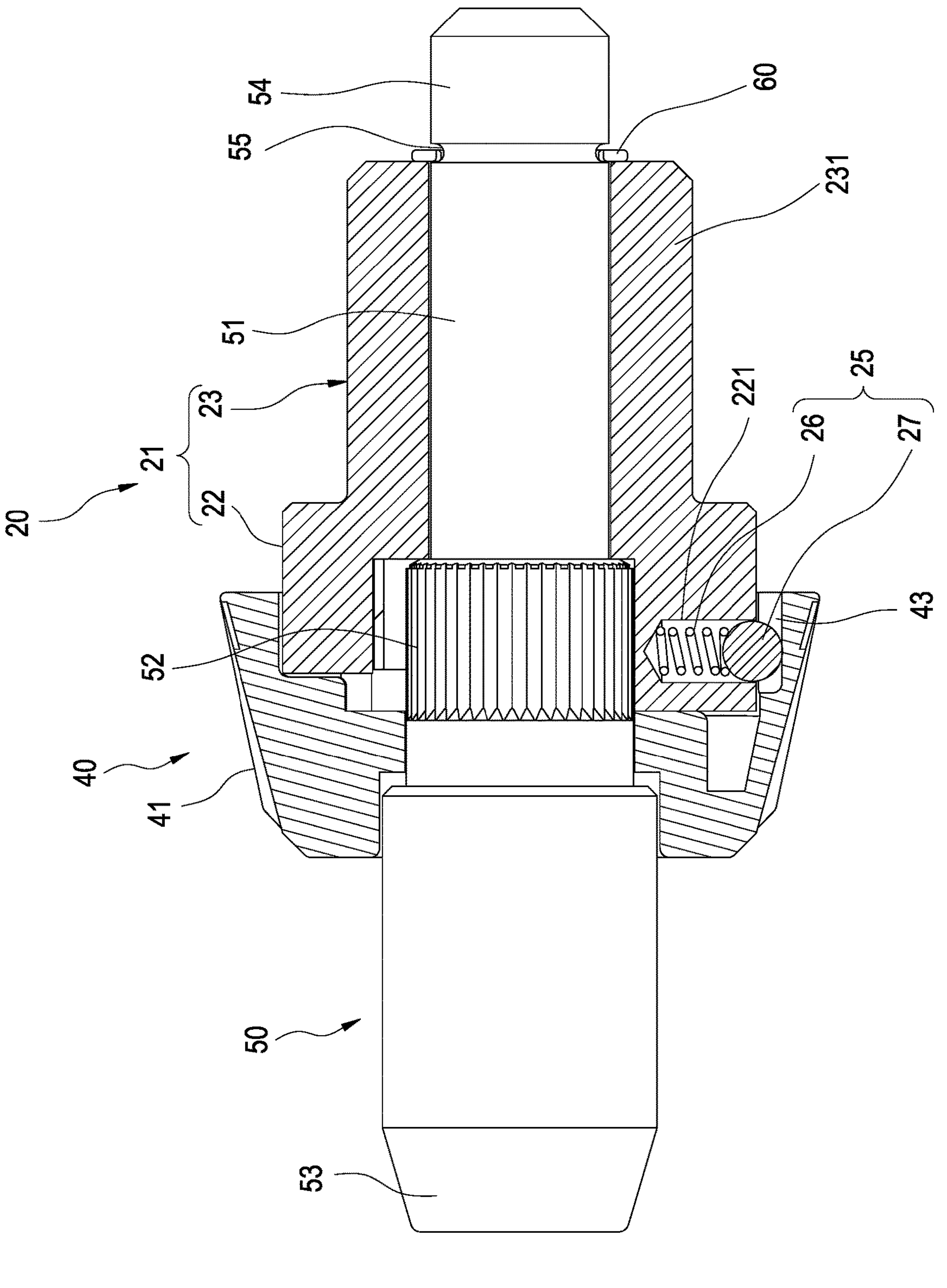
FIG. 3 is a cross sectional view showing the assembly of the actuating unit, the positioning unit, the switching component and the rotating rod according to the present disclosure.

Please refer from FIG. 1 to FIG. 3, the present disclosure provides a hand tool capable of switching operating direction. In some embodiments, the hand tool is a screwdriver having a ratchet, and mainly includes a handgrip 10, an actuating unit 20, a positioning unit 30, a switching component 40 and a rotating rod 50.

The handgrip 10 is used for the user to hold. The handgrip 10 is a component made of a material such as a soft plastic or a rubber.

The actuating unit 20 is disposed in the handgrip 10, and mainly includes an actuating seat 21 and a positioning set 25. The actuating seat 21 mainly includes a sleeve tube 22 and a tube member 23 extended from the sleeve tube 22. An accommodating slot 221 is formed on an outer surface of the sleeve tube 22, and a plurality of pivotal slots 222 are formed in the sleeve tube 22. Each of the pivotal slots 222 are arranged with intervals. A convex rib 223 is disposed between each of the pivotal slots 222 in the sleeve tube 22. The convex rib 223 is formed at a central location of each of the pivotal slots 222. A front zone of each of the pivotal slots 222 is formed with an acting slot 224. An inner wall surface 225 is formed in the sleeve tube 22. A stop surface 226 is formed at an edge of each of the pivotal slots 222 of the sleeve tube 22.

A plurality of mounting strips 231 are formed on an outer surface of the tube member 23. Each of the mounting strips 231 is mutually fastened and combined with the handgrip 10. The positioning set 25 mainly includes an elastic member 26 and a positioning member 27 abutting against the elastic member 26. In some embodiments, the elastic member 26 is a compression spring which is disposed in the accommodating slot 221. In some embodiments, the positioning member 27 is a rolling ball moveably entering in or retracting from the accommodating slot 221.

The positioning unit 30 is disposed in the sleeve tube 22 of the actuating seat 21, and mainly includes a plurality of latching members 31 and an elastic unit 32. One end of each of the latching members 31 has at least one latching tooth 311, and another end of each of the latching members 31 has a pivotal shaft 312. A recessed zone 313 is formed at a front side of the latching member 31. Each of the pivotal shafts 312 is correspondingly and pivotally connected to the pivotal slot 222. Each of the stop surfaces 226 of the sleeve tube 22 is formed at a lateral side of the latching member 31, thus a deflecting rotation stroke of each of the latching members 31 is limited. As such, malfunctioning situations of being jammed or not being recovered due to the latching member 31 being overly displaced are prevented. In some embodiments, apart from one latching tooth 311, a plurality of the latching teeth 311 may also be implemented.

In some embodiments, the elastic unit 32 is a W-shaped elastic sheet. One end of the elastic unit 32 has a concave groove 321, and another end of the elastic unit 32 has two abutting sheets 322. The concave groove 321 is used to fasten the convex rib 223. Each of the abutting sheets 322 abuts against each of the latching members 31.

The switching component 40 is moveably connected to the actuating seat 21 and formed on a distal surface of the handgrip 10. The switching component 40 has a rotation disk 41. A plurality of abutting blocks 42 are extended in the rotation disk 41, and a plurality of positioning slots 43 are disposed in the rotation disk 41. The abutting blocks 42 are spaced with an interval and arranged corresponding to the latching members 31. The abutting block 42 rotates and moves in the acting slot 224, and the positioning member 27 makes each of the positioning slots 43 be selectively mounted.

The rotating rod 50 includes a rod member 51 and a ratchet 52 disposed at a middle segment of the rod member 51. One end of the rod member 51 is formed as a tool head 53, another end of the rod member 51 is formed as a combining end 54. The rod member 51 sequentially passes through the rotation disk 41 and the actuating seat 21 via the combining end 54, thus the ratchet 52 is disposed in the sleeve tube 52 of the actuating seat 21 and arranged corresponding to each of the latching members 31. The inner wall surface 225 stably covers an outer periphery of the ratchet 52. When the abutting block 42 abuts against the latching member 31, the latching member 31 may interfere with the abutting block 42 via the recessed zone 313 and avoid contacting the pivotal shaft 312.

In some embodiments, the hand tool capable of switching operating direction provided by the present disclosure further includes a buckling ring 60. A buckling slot 55 is disposed at an inner side of the rod member 51 and located close to the combining end 54. The buckling ring 60 is buckled with the buckling slot 55, thus the actuating seat 21 and the switching component 40 are adjacent to each other.

What shall be addressed is as follows. With an arrangement of each of the latching members 31, the elastic unit 32 and the actuating seat 21, each of the abutting sheets 322 stably abuts against at one end of each of the latching members 31. With each of the pivotal slots 222 pivotally connected at another end of each of the latching members 31, each of the latching members 31 generates a stable deflecting rotation, thus malfunctioning situations of being jammed, loosened or not being recovered due to each of the latching teeth 311 being overly displaced are prevented.

Figure 4:
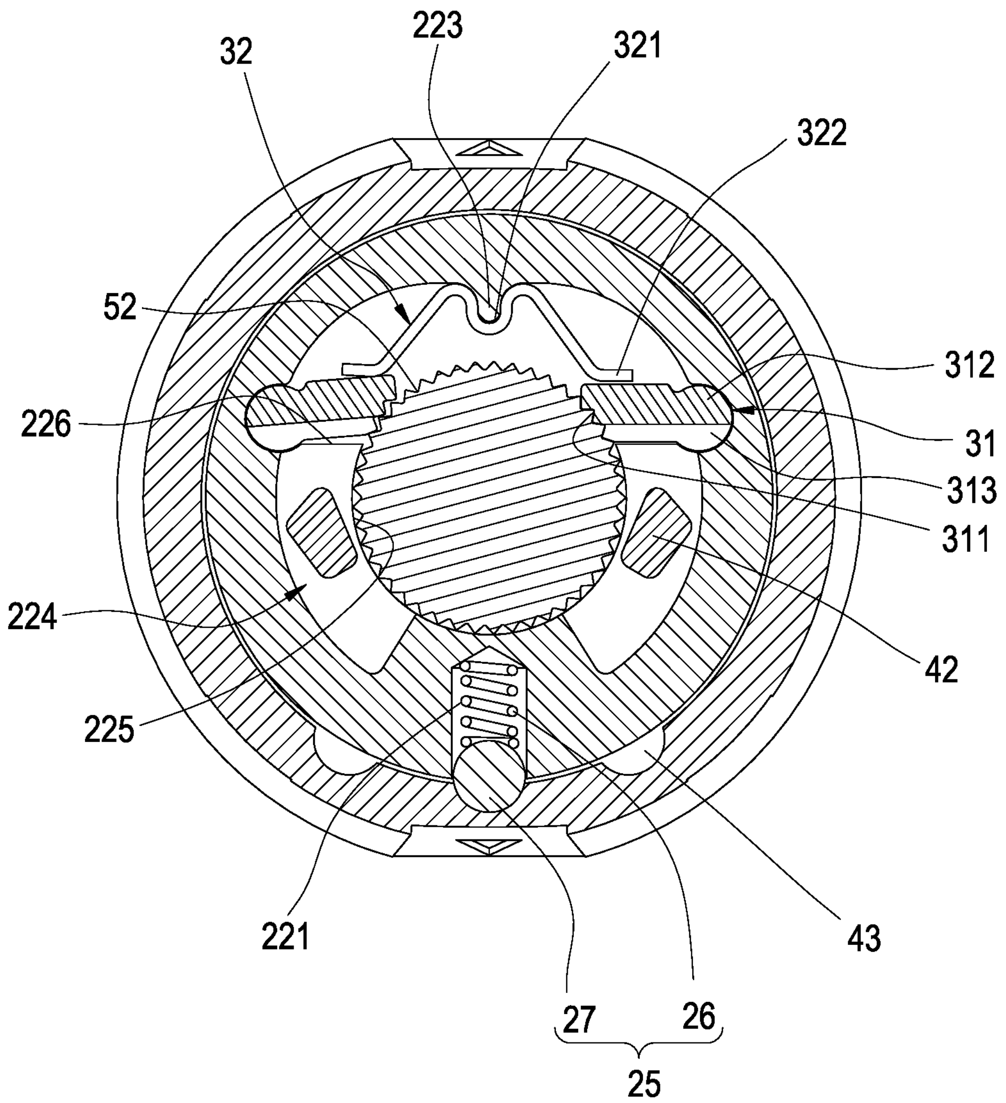
FIG. 4 is a cross sectional view showing an operating status of the actuating unit, the positioning unit, the switching component and the rotating rod according to the present disclosure.

Please refer to FIG. 4, when being operated, the rotation disk 41 makes the positioning member 27 be selectively mounted in one of the positioning slots 43, each of the abutting blocks 42 correspondingly abuts against each of the latching members 31 to generate the deflecting rotation, thus the latching teeth 311 are latched with or released from the ratchet 52.

Please refer to FIG. 4, the positioning member 27 is mounted in the positioning slot 43 located at the center, and a gap distance is formed between each of the abutting blocks 42 and each of the latching members 31. At this moment, the tool head 53 (as shown in FIG. 2) may be operated clockwise or counterclockwise.

Figure 5:
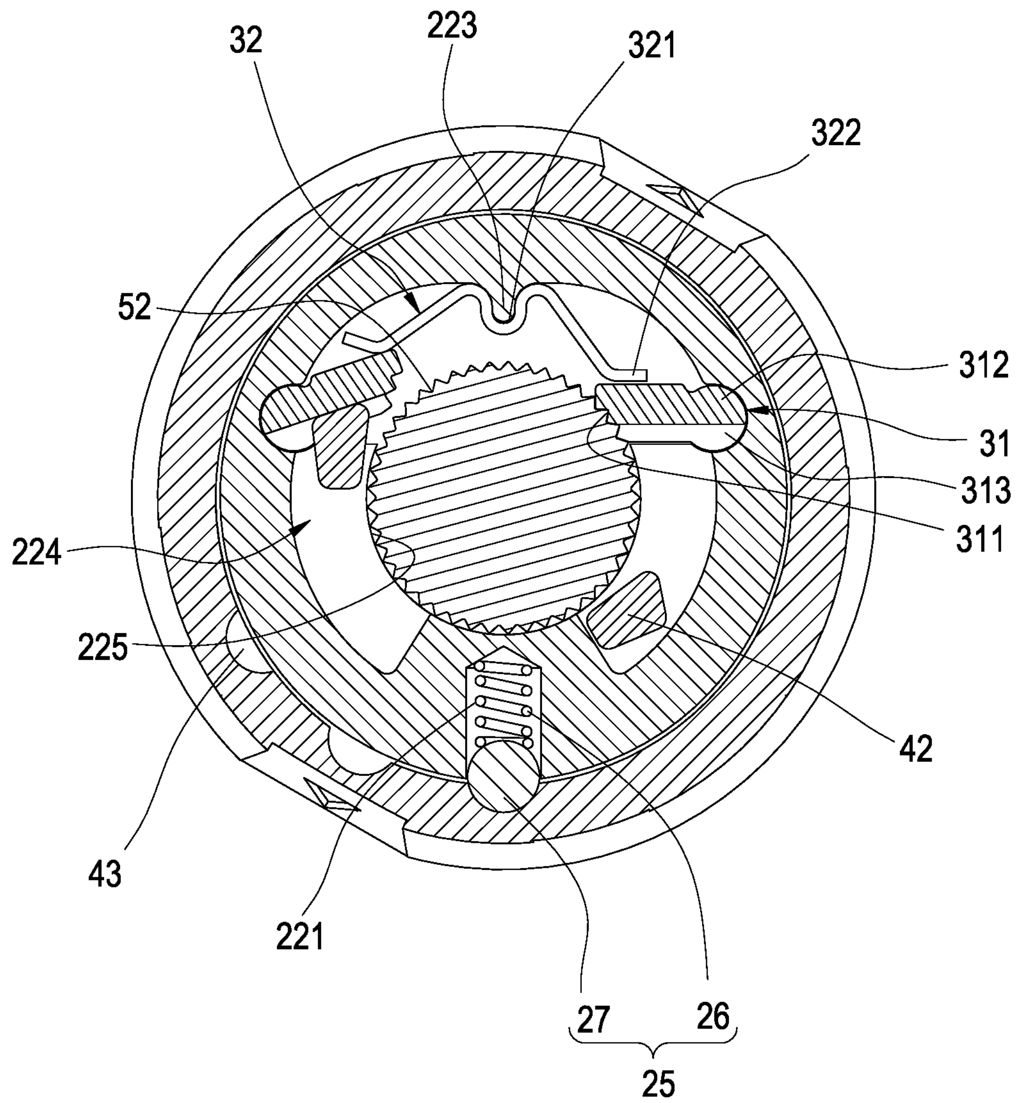
FIG. 5 is a cross sectional view showing another operating status of the actuating unit, the positioning unit, the switching component and the rotating rod according to the present disclosure.
Figure 6:
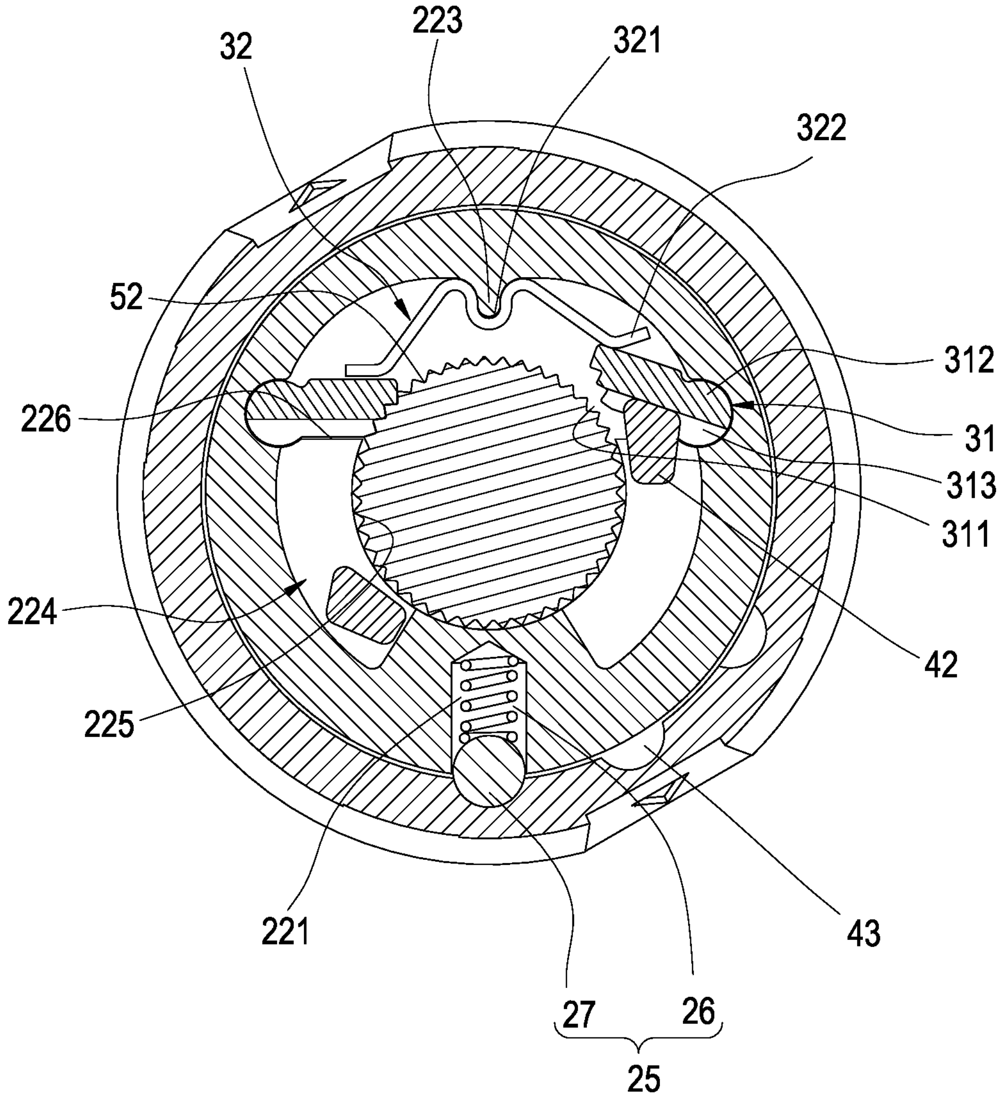
FIG. 6 is a cross sectional view showing one another operating status of the actuating unit, the positioning unit, the switching component and the rotating rod according to the present disclosure.

Please refer to FIG. 5 and FIG. 6, when the rotation disk 41 is being rotated counterclockwise (as shown in FIG. 5), the positioning member 27 is mounted in the positioning slot 43 located above (defined at the right side of the central positioning slot), the abutting block 42 located on left side abuts against the latching member 31 located on left side to generate the deflecting rotation, thus each of the latching teeth 311 is not engaged with the ratchet 52 and released from the ratchet 52. Each of the latching teeth 31 of the latching member 31 located on right side is kept to be engaged with the ratchet 52. At this moment, the tool head 53 (as shown in FIG. 2) drives the ratchet 52 to be counterclockwise operated. Moreover, when the tool head 53 rotates clockwise, the ratchet 52 generates idle rotations, thus an objective of being operated in single direction, which is counterclockwise, is achieved.

Please refer to FIG. 6, when the rotation disk 41 is rotated clockwise, the positioning member 27 is mounted in the positioning slot 43 located below (defined at the left side of the central positioning slot), the abutting block 42 located on right side abuts against the latching member 31 located on right side to generate the deflecting rotation, thus each of the latching teeth 311 is not engaged with the ratchet 52 and released from the ratchet 52. Each of the latching teeth 311 of the latching member 31 located on right side is kept to be engaged with the ratchet 52. At the same time, the tool head 53 (as shown in FIG. 2) drives the ratchet 52 to be clockwise operated. Moreover, when the tool head 53 rotates counterclockwise, the ratchet 52 generates the idle rotations, thus an objective of being operated in single direction, which is clockwise, is achieved.

While this disclosure has been described by means of specific embodiments, numerous modifications and variations could be made thereto by those skilled in the art without departing from the scope and spirit of this disclosure set forth in the claims.

What is claimed is:

1. A hand tool (1), comprising:

a handgrip (10);

an actuating unit (20), disposed in the handgrip (10) and comprising an actuating seat (21) and a positioning set (25), wherein the actuating seat (21) comprises a cylindrical accommodating slot (221) and a plurality of pivotal slots (222), the positioning set (25) comprises an elastic spring (26) and an individual positioning member (27) abutting against the elastic spring (26), and the elastic spring (26) is disposed in the cylindrical accommodating slot (221);

a positioning unit (30), disposed in the actuating seat (21) and comprising a plurality of latching members (31) and a W-shaped elastic unit (32), wherein each of the latching members (31) is pivotally connected to each of the pivotal slots (222), each of the latching members (31) comprises at least one latching tooth (331), one end of the W-shaped elastic unit (32) is fastened with the actuating seat (21), and another end of the W-shaped elastic unit (32) abuts against each of the latching members (31);

a switching component (40), moveably connected to the actuating seat (21) and comprising a rotation disk (41) and a plurality of abutting blocks (42) disposed on the rotation disk (41), wherein the rotation disk (41) comprises a plurality of positioning slots (43), and the individual positioning member (27) is mounted in one of the positioning slots (43); and a rotating rod (50), comprising a rod member (51) and a ratchet (52) disposed on the rod member (51), wherein one end of the rod member (51) sequentially passes through the rotation disk (41) and the actuation seat (21), and the ratchet (52) is arranged corresponding to each of the latching members (31);

wherein, when the rotation disk (41) is being rotated to make the individual positioning member (27) be selectively mounted in one of the positioning slots (43), each of the abutting blocks (42) correspondingly abuts against each of the latching members (31) to generate a deflecting rotation to make the latching tooth (311) be latched with or released from the ratchet (52);

wherein the actuating seat (21) comprises a sleeve tube (22), each of the pivotal slots (222) is disposed spacedly in the sleeve tube (22), only one convex rib (223) is disposed between each of the pivotal slots (222) in the sleeve tube (22); the W-shaped elastic unit (32) comprises only one concave groove (321) and a plurality of abutting sheets (322), the only one convex rib (223) is mounted in the only one concave groove (321), and each of the abutting sheets (322) abuts against each of the latching members (31);

wherein each of the latching members (31) further comprises a pivotal shaft (312) located away from the latching tooth (311), and each of the latching members (31) is pivotally connected to the pivotal slot (222) via the pivotal shaft (312);

wherein each of the latching members (31) further comprises a recessed zone (313), and each of the abutting blocks (42) abuts against the recessed zone (313) to generate the deflecting rotation.

2. The hand tool (1) according to claim 1, wherein the sleeve tube (22) comprises an acting slot (224) disposed on one end of each of the pivotal slots (222) thereof, and the abutting block (42) is configured to move in the acting slot (224).

3. The hand tool (1) according to claim 1, wherein the sleeve tube (22) comprises a stop surface (226) disposed on an edge of each of the pivotal slots (222) thereof, and the stop surface (226) is configured to limit a deflecting rotation stroke of the latching member (31).

4. The hand tool (1) according to claim 1, wherein the sleeve tube (22) comprises an inner wall surface (225) covering an outer periphery of the ratchet (52).

5. The hand tool (1) according to claim 1, wherein each of the latching members (31) comprises a plurality of the latching teeth (311).

6. The hand tool (1) according to claim 1, wherein the rod member (51) comprises a tool head (53) disposed on one end thereof and a combining end (54) disposed on another end thereof, the rod member (51) sequentially passes through the rotation disk (41) and the actuating seat (21) via the combining end (54), and the tool head (53) is exposed from the rotation disk (41).

* * * * *